W. J. BUTTSCHAU.
SEED TESTING APPARATUS.
APPLICATION FILED APR. 22, 1912.
1,031,771.
Patented July 9, 1912.
2 SHEETS—SHEET 1.
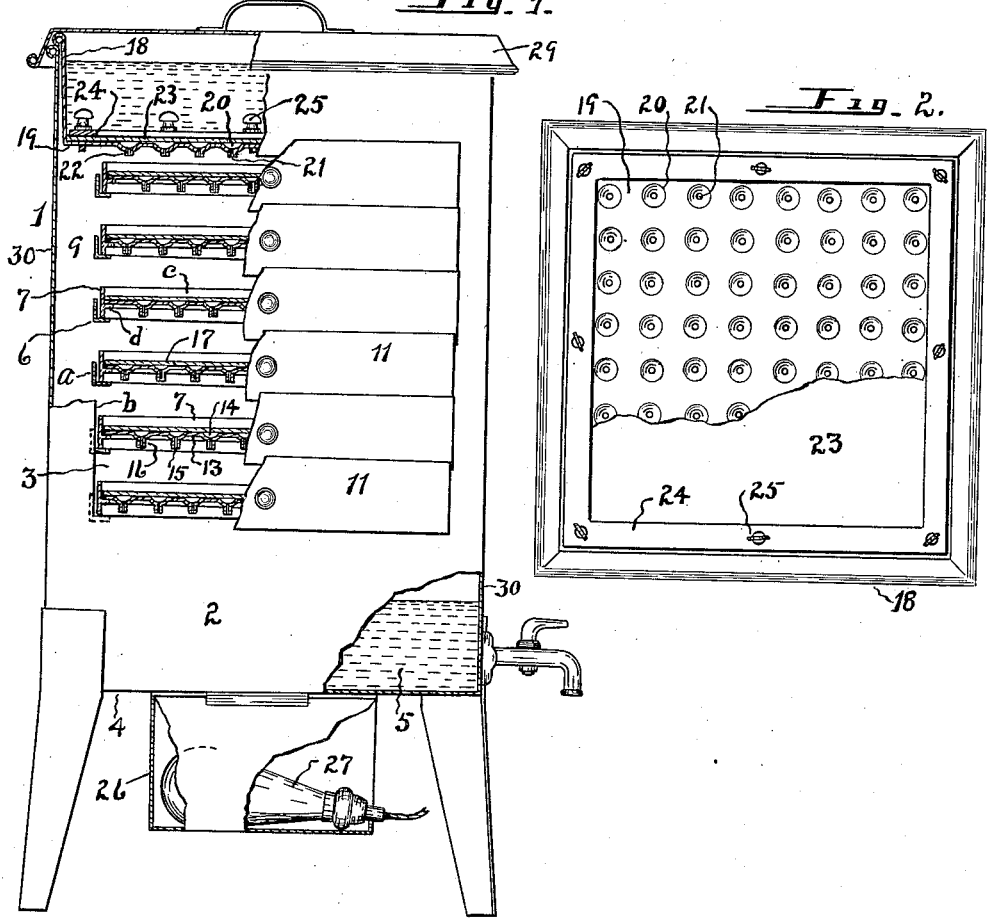
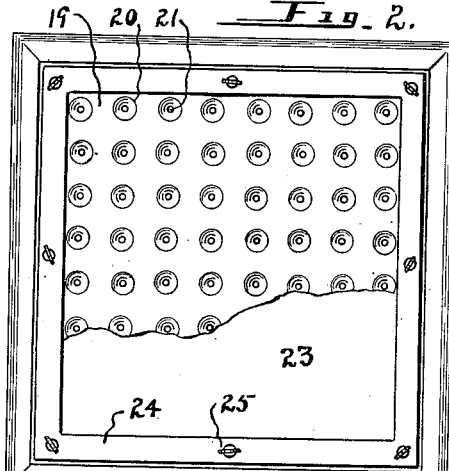
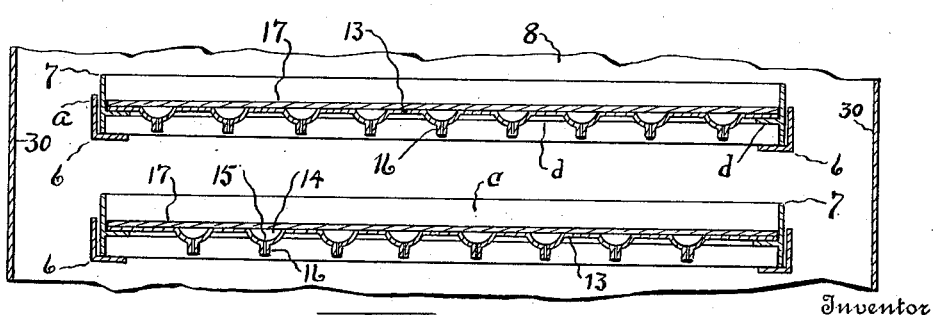
Witnesses
A. R. Leyson
D. C. Busse
Inventor
William J. Buttschau,
By Hiram A. Sturges,
Attorney W. J. BUTTSCHAU.
SEED TESTING APPARATUS.
APPLICATION FILED APR. 22, 1912.
1,031,771.
Patented July 9, 1912.
2 SHEETS—SHEET 2.
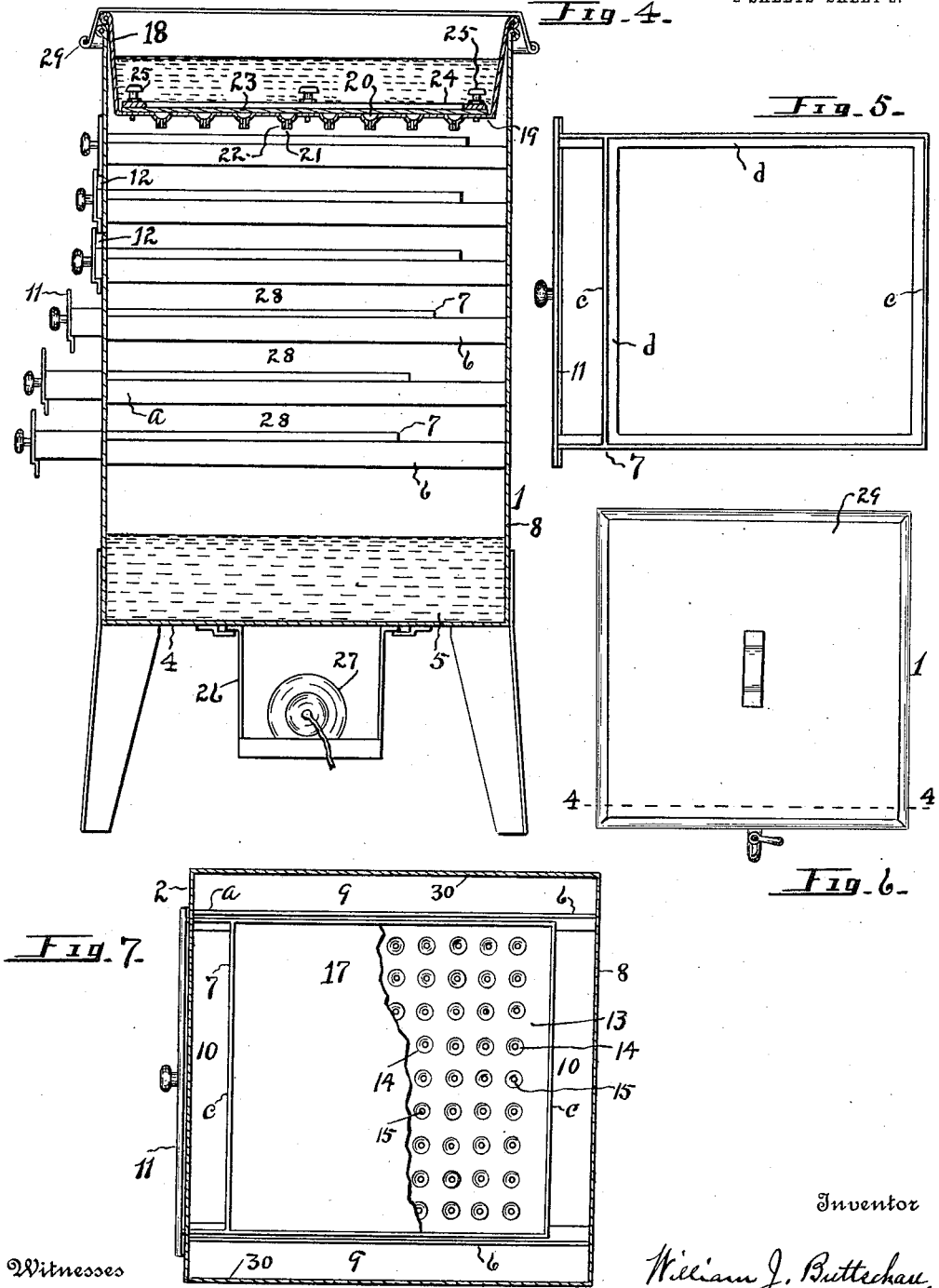

UNITED STATES PATENT OFFICE.

WILLIAM J. BUTTSCHAU, OF OMAHA, NEBRASKA.

SEED-TESTING APPARATUS.

1,031,771.   Specification of Letters Patent.   Patented July 9, 1912.

Application filed April 22, 1912. Serial No. 692,217.

*To all whom it may concern:*

Be it known that I, WILLIAM J. BUTTSCHAU, a citizen of the United States, residing at Omaha, in the county of Douglas and State of Nebraska, have invented certain new and useful Improvements in Seed-Testing Apparatus, of which the following is a specification.

This invention relates to an improved seed testing apparatus, and has for its object to provide an article particularly adapted for the use of maltsters in testing the germinating quality of grain, and which may be also employed to advantage by farmers or dealers in seeds for analogous purposes.

The invention includes a cabinet so arranged that the trays which contain the seed to be tested will be separated from each other and will be surrounded by an air chamber; it also includes an upper and lower water supply, and means to control a passage of the water from one supply to the other in a manner to cause its gradual vaporization.

Other objects and advantages of the invention will be described hereinafter.

The invention consists of the novel construction, combination and arrangement of parts as described and claimed, and as illustrated in the drawing, it being understood that changes in form, size, proportion and minor details may be made within the scope of the claims without departing from the spirit of the invention or sacrificing any of its advantages.

In the accompanying drawing Figure 1 is a front view, partly broken and in section, of a seed or grain testing apparatus embodying my invention. Fig. 2 is a plan view of the dripping-pan or water receptacle, the filter being partly broken. Fig. 3 is an enlarged detail relating to Fig. 1 showing, in section, a part of the cabinet, and a pair of supported tray-frames with dripping-plates. Fig. 4 is a view of the apparatus in longitudinal section, taken on line 4 4 of Fig 6. Fig. 5 is a plan view of a tray-frame. Fig. 6 is a plan view of the apparatus. Fig. 7 is a transverse sectional view through the cabinet, to show relative position of parts, and the formation of air chambers at the sides and ends of the trays, the absorbent layer being broken away.

Referring to the drawing for a more particular description, numeral 1 indicates a cabinet preferably formed rectangular in cross section, with an open top; its front wall 2 may be formed with a rectangular aperture 3; and the cabinet provides intermediate said aperture and its bottom 4, a water reservoir 5.

At 6 are indicated bracket-strips upon which tray-frame 7 may be slidably supported. The strips 6 are preferably of L-shape in cross-section, and they are disposed substantially parallel, their respective terminals, as best shown in Fig. 4, being secured to the rear wall 8 and front wall 4 of the cabinet, and the upright wing $a$ of the front terminals of said strips are preferably disposed flush with the vertical edges $b$ (Fig. 1.) defining or forming the aperture 3. Said strips are disposed adjacent to the side-walls 30 of the cabinet to form between said walls and strips (Fig. 7) the air-passageways 9.

Each tray-frame 7 is of rectangular form, its sides and ends preferably being of L-shape in cross-section. It has a length less than the depth of the cabinet, and when disposed in a normal position air-passageways 10 will be formed in the front and rear parts of the cabinet adjacent to its upright wings $c$.

At 11 are indicated closure-plates, these being formed angular in cross-section; they are mounted upon the front ends of the side-strips of the tray-frames, and are constructed of such a width that when said frames are in their normal position, the closure plate of a lower frame will overlap the lower edge of a closure-plate of an adjacent, upper tray-frame, and this arrangement therefore provides vent-apertures 12 for the cabinet at the ends of the closure-plates.

In operation, a single tray may be removed without disturbing the other trays; to accomplish the removal of a single tray, its front end should be elevated before being drawn forwardly, and by referring to Fig. 4 it will be seen that its lower edge may then pass over the upper edge of an adjacent lower tray; and it will be noted that all of the trays may be conveniently removed, as a unit, by drawing forwardly the uppermost tray.

At 13 are indicated rectangular, flat dripping-plates formed with numerous, annular depressions 14, said plates having perforations 15 formed at the middle of the depressions, and provided with downwardly projecting discharge-nozzles 16 communicating with said perforations. Plates 13 may be disposed upon the horizontal ledges $d$ of the tray-frames, and upon said plates may be disposed an absorbent layer 17 of blotting paper or similar material.

At 18 is indicated a dripping-pan or water receptacle having a bottom 19 formed with numerous, annular depressions 20, said bottom being provided at the middle of each depression with an aperture 21, and with downwardly-projecting discharge nozzles 22 communicating with said apertures.

At 23 is indicated a filter-layer, preferably of asbestos, adapted to lie upon the bottom of the receptacle.

At 24 is indicated a rectangular compression-frame adapted to be disposed upon and near the edges of layer 23; and by means of screw-bolts or keepers 25, each of which may traverse frame 24 and have a threaded connection with the bottom 19, the asbestos layer may be compressed in a manner to prevent the passage of water between its edges and said bottom.

Receptacle 18 may be disposed to make a closure of the open-top of the cabinet and water may be placed therein and in reservoir 5.

At 26 is indicated a casing for providing a heating chamber, said casing being mounted upon the bottom 4 of the cabinet, and any suitable heating agent 27 may be placed therein for imparting a limited degree of heat to the water in the reservoir.

It will be understood that seed or grain to be tested may be placed in the trays upon layers 17; and in operation, water from receptacle 18 will gradually pass through layer 23 in a filtered condition, and will be collected within depressions 20, and will pass through nozzles 22 to fall upon the absorbent layer 17 of the uppermost tray. After the layer of this tray has been fully saturated the water will collect in depressions 14, and will pass through nozzles 16 upon the absorbent layer of the next lower tray. Any suitable number of trays may be employed for the cabinet, and they may have any desired size; they may be disposed one above the other to provide any suitable air space 28 therebetween (Fig. 4). After the water has saturated the absorbent layers of all of the trays, all water not thus absorbed or vaporized will pass within reservoir 5; a part of the water may then be drawn off, and by its use the receptacle 18 may be replenished.

At 29 is indicated a hood or cover for the cabinet, which tends to maintain the water within receptacle 18 at a uniform temperature.

Among some of the advantages to be derived by use of the herein described apparatus, it may be stated that depressions 14 of the flat plates 13 cause the surplus water to be drawn from the absorbent layer 17 and to be discharged uniformly over the area of the absorbent layer of the next lower tray, the nozzles conveying the water below the lower surface of each plate.

It may often happen that the cabinet will not stand level, and the trays on this account will be disposed inclinedly, and if the nozzles were not employed the water would adhere to the bottom and would move toward one of the sides or ends of the plates. By use of the depressions and downwardly projecting nozzles the water is discharged uniformly or substantially so, and the absorbent layers are uniformly saturated whether the trays are disposed "level" or inclinedly, and this uniformity in the distribution of moisture is obviously of importance, in the operation of testing the germinating quality of seeds or grain.

The advantages to be derived by the use of depressions 20 and nozzles 22 for the bottom of receptacle 18 are the same as described in connection with the trays. It will be noted that the arrangement of the plates in the several tray-frames is such that the nozzles of each plate are disposed in planes between the nozzles of the plate thereabove, and this is a desired feature since it is important that the water may drop upon the flat portions of the plates to be drained therefrom and will not drop upon portions of the layer above the depressions.

The asbestos layer forming the filter may have any suitable thickness or degree of porousness to control the movement of water passing therethrough, and in practice one drop succeeds another at short intervals while passing through the nozzles of member 18.

From the construction as described it will be seen that a volume of warm or tepid water is maintained both above and below the grain or seeds to be tested, and this feature tends to maintain uniformity of temperature for the contents of the trays, the contents of receptacle 18 being replenished from reservoir 5. The construction provides a mounting for each tray so that it is practically circumscribed or surrounded by an air chamber or air-passageway.

When disposed normally, each vent aperture 12 provides means for ingress or egress of air, for the ventilation of each of the trays adjacent thereto.

The advantages of passing filtered water to the seeds or grain is obvious, and this is provided by member 23. In order that this member may be removed when it becomes foul, and may be replaced by a new layer, members 25 provide adjustable means for this purpose which may be conveniently operated.

It is considered that the arrangement of the closure plates 11 for the convenient removal of the trays, or any one of them, is a useful feature.

Since the water for the dripping pan is supplied from the reservoir, all of the water which passes through the trays is substantially uniform in temperature; the apparatus, therefore, is always ready for use, and after the dripping-pan has been supplied with water, the operation is automatic, and requires no attention.

By reason of the construction, undue saturation of grain or seed may be avoided, since any excess of water which may pass to a tray will be collected in the depressions formed in its bottom; and on account of the uniformity of moisture supplied, and the fact that ventilation is provided in the horizontal plane of each tray, mold will not form during the operation of testing.

The cabinet, trays and nearly all of the parts may be constructed to advantage of galvanized metallic sheets, and since the parts are few in number, the apparatus may be economically constructed.

While I have described tray-frames, and separate dripping-plates to be mounted therein, each plate and frame may be manufactured as an integral structure, if desired; and while it is preferred to employ reservoir 5 and water receptacle 18 as a lower and upper water supply, the apparatus would be operative, in some instances, if a single water supply was provided; and in some instances a heating agent 27 may be dispensed with.

Having fully described my invention, what I claim as new and desire to secure by Letters Patent is,—

1. A seed testing apparatus, comprising in combination with a cabinet formed with a rectangular aperture in its front wall, and providing intermediate said aperture and its bottom a water reservoir; bracket-strips disposed horizontally adjacent to the side walls and supported by the rear and front walls of the cabinet; tray-frames slidably mounted upon said strips; perforated plates adapted to support absorbent layers, said plates being mounted upon the tray-frames and provided with downwardly projecting nozzles; a water-receptacle supported in the upper part of the cabinet, said receptacle having a bottom formed with apertures and with downwardly projecting nozzles communicating with said apertures; a layer of filtering material disposed within and adapted to lie upon the bottom of said receptacle, and an agent for applying heat to the water-reservoir.

2. A seed testing apparatus, comprising in combination with a cabinet formed with a rectangular aperture in its front wall, and providing intermediate said aperture and its bottom a water reservoir; substantially parallel bracket-strips disposed adjacent to the side walls and supported by the rear and front walls of the cabinet; trays adapted to support an absorbent layer and mounted upon the bracket-strips, said trays having bottoms formed with numerous, apertured depressions and provided with nozzles communicating with the apertures and projecting downwardly from said depressions; a water-receptacle supported within the upper part of the cabinet and having a bottom formed with apertured depressions and with downwardly projecting nozzles communicating with said apertures; a layer of filtering material disposed within and adapted to lie upon the bottom of said receptacle, and an agent for applying heat to the water-reservoir.

3. A seed testing apparatus comprising, in combination with a cabinet provided with a heating agent and with removable trays for containing the seed; a water receptacle supported in the cabinet above said trays, said receptable having a bottom formed with apertured depressions and provided with downwardly-projecting nozzles communicating with said apertures.

4. An apparatus for the purpose described, comprising, in combination, a cabinet; a plurality of trays disposed one above the other within the cabinet, a water-receptacle disposed above said trays, said trays and water-receptacle being provided with bottoms having depressed portions and formed with nozzles having discharge passageways opening upon said depressed portions.

5. An apparatus for the purpose described, comprising, in combination with a cabinet formed with an aperture in its front wall and provided with a water reservoir; a heating agent for said reservoir; a plurality of trays provided upon their front ends with closure plates, said trays being adapted to be disposed one above the other above said reservoir, said closure-plates making engagement with each other and with said front wall and forming intermediate the wall and said plates a plurality of vent-passageways; a water receptacle disposed above said trays, said receptacle having a bottom formed with annular depressions and with nozzles for conducting water to points below said depressions; and a filter member secured upon the bottom of said receptacle and disposed to overhang said depressions.

6. An apparatus for the purpose described, comprising, in combination with a cabinet having a plurality of trays adapted to be disposed one above the other while removably mounted therein; absorbent layers carried by the trays; a water-receptacle provided with a filter and disposed above said trays while removably mounted in the cabinet, said trays and water-receptacle each being formed with a bottom having annularly depressed portions, and provided with nozzles arranged to communicate with and to conduct water downwardly from said depressed portions.

7. An apparatus for the purpose described, comprising, in combination with a cabinet provided with a plurality of trays adapted to be disposed adjacent to each other in a vertical plane; absorbent layers carried by the trays; a water-receptacle disposed above the uppermost of said trays; said trays and water-receptacle each being formed with a bottom having annularly depressed portions with downwardly-projecting nozzles, the arrangement being that the depressed portions of one tray are disposed in a vertical plane adjacent to the vertical plane of the depressed portions of an adjoining tray.

8. An apparatus for the purpose described, comprising, in combination with a cabinet provided with a water-reservoir and and agent for heating said reservoir; a plurality of trays provided with absorbent layers and disposed above the reservoir within and transversely of the cabinet; a water receptacle disposed above said trays and having a bottom formed upon its lower side with apertured projections; an asbestos layer disposed within the receptacle, a frame-member adapted to bear upon said layer; and adjustable means to cause a compression of portions of the asbestos layer between said frame-member and the bottom of the water-receptacle.

9. An apparatus for the purpose described, comprising, in combination with a cabinet provided with a plurality of trays adapted to be disposed adjacent to each other in a vertical plane; absorbent layers carried by the trays; a water-receptacle disposed above said trays, said trays and water-receptacle each being provided with a bottom having depressed, apertured portions and with apertured projections disposed below and opening upon the apertures of said depressed portions; a filter-member within the water-receptacle; and adjustable means for maintaining the filter-member in engagement with the bottom of said receptacle.

10. An apparatus for the purpose described, comprising, in combination with a cabinet having upright walls and formed rectangular in plan, said cabinet being provided with a water reservoir and a heating agent therefor; a plurality of trays rectangular in plan, each being supported in and transversely of the cabinet above the reservoir to provide an air passageway intermediate each of its sides and ends and the respective adjacent walls of the cabinet, said trays being provided with bottoms having annularly depressed apertured portions, and having projections formed upon their lower sides with apertures communicating with the apertures of said depressed portions; a water-receptacle disposed above said trays, a filter-member removably mounted in said receptacle, said receptacle having a bottom provided with a plurality of downwardly-projecting nozzles for conducting water to said trays.

11. An apparatus for the purpose described, comprising, in combination with a cabinet provided with trays having apertured bottoms, a water-receptacle disposed above said trays and having a bottom formed at substantially uniformly-spaced intervals with annularly depressed apertured portions, and provided upon its lower side with downwardly-projecting members for conducting water from said depressions; and a filter layer removably mounted in said water-receptacle.

In testimony whereof I have affixed my signature in presence of two witnesses.

WILLIAM J. BUTTSCHAU.

Witnesses:
  HIRAM A. STURGES,
  KLARA HANSON.

---

Copies of this patent may be obtained for five cents each, by addressing the "Commissioner of Patents, Washington, D. C."